United States Patent Office 3,163,659
Patented Dec. 29, 1964

3,163,659
PROCESS FOR THE MANUFACTURE OF 4,5-DI-CHLORO- AND 4,5-DIBROMO-NAPHTHALENE-1,8-DICARBOXYLIC ACIDS AND THEIR ANHYDRIDES
Heinrich Sieber, Frankfurt am Main, Germany, assignor to Farbwerke Hoechst Aktiengesellschaft vormals Meister Lucius & Brüning, Frankfurt am Main, Germany, a corporation of Germany
No Drawing. Filed Apr. 16, 1963, Ser. No. 273,286
Claims priority, application Germany, Apr. 19, 1962, F 36,599
2 Claims. (Cl. 260—345.2)

The 4,5-dichloro- and 4,5-dibromo-naphthalene-1,8-dicarboxylic acids and their anhydrides, which are suitable as intermediate products for the preparation of vat dyestuffs, can be obtained by oxidizing 5,6-dichloro- or 5,6-dibromo-acenaphthene with sodium bichromate in glacial acetic acid (Chemical Abstracts, vol. 32 (1938), page 4974). Only about 10% of the substance formed during the oxidation are dicarboxylic acid, the main product being the corresponding dihalogen-acenaphthenequinone. Even when using a great excess of sodium bichromate, the yield of dicarboxylic acid does not increase. For production on an industrial scale a process having such a small yield is of no value.

It has now been found that the 4,5-dichloro- and 4,5-dibromo-naphthalene-dicarboxylic acids and their anhydrides can be obtained in very simple manner with excellent yield by dissolving 1,4,5,8-naphthalene-tetracarboxylic acid or its anhydride in water in the presence of alkali metal hydroxides, carbonates, acetates or phosphates and reacting the solution obtained at a temperature in the range from 10° to 70° C., preferably 30° to 40° C., at a pH-value of between 4 and 6.5, preferably between 5 and 6, with chlorine or bromine or agents yielding these halogens.

In carrying out the process, it is advantageous first to paste up the naphthalene-tetracarboxylic acid in water, then to dissolve the paste by adding alkali metal hydroxides, carbonates, acetates or phosphates and to introduce gaseous chlorine or to add bromine dropwise, while maintaining a pH-value of between 5 and 6. The temperature is advantageously kept in the range from 30° to 40° C. Already shortly after the reaction set in, the reaction product separates from the solution. When the reaction is complete, the whole is filtered, the filter residue is boiled together with dilute hydrochloric acid, the mixture is filtered again, the filter residue is washed until neutral and dried. Instead of chlorine a sodium hypochlorite liquor may be used with equally good success. Furthermore, bromosuccinimide may also be used instead of bromine. When operating in the above-described manner the 4,5-dichloro- or 4,5-dibromo-naphthalene-1,8-dicarboxylic acid anhydride, which in its above form is, in most cases, sufficiently pure for reaction, is obtained in very good yield. By recrystallizing it once from nitrobenzene or dimethylformamide pure products are obtained.

It is surprising that in the process of the present invention, wherein two carboxylic acid groups are exchanged without difficulty for halogen atoms, no difficultly separable mixtures of the three possible dihalogen-naphthalene-dichraboxylic acids are formed, but the 4,5-dichloro- or 4,5-dibromo-naphthalene-1,8-dicarboxylic acid is obtained in very good yield. That is to say, in the present process only the two carboxylic acid groups standing in periposition are exchanged for halogen atoms. It is not possible to exchange only one carboxylic acid group distinctly for one halogen atom, when using less than 2 mols of halogen per 1 mol of naphthlene-tetracarboxylic acid, or to replace more than 2 carboxylic acid groups by halogen atoms, when using more than 2 mols of halogen.

The compounds obtained by the process of the present invention are valuable intermediate products for the preparation of vat dyestuffs.

The following examples serve to illustrate the invention, but they are not intended to limit it thereto, the parts being by weight unless otherwise stated and the relationship of parts by weight to parts by volume being the same as that of the kilogram to the liter.

Example 1

300 parts of 1,4,5,8-naphthalene-tetracarboxylic acid are dissolved in 4000 parts of water and 400 parts by volume of a sodium hydroxide solution of 33% strength. About 300 parts of gaseous chlorine are introduced into the solution within 6 hours at 30° to 40° C. The product formed during the reaction separates from the solution. It is filtered off with suction, boiled with dilute hydrochloric acid, filtered off with suction again and washed until neutral. The yield is 260 parts. After recrystallization from acetic acid anhydride or dimethylformamide the 4,5-dichloro-naphthalene-1,8-dicarboxylic acid anhydride melts at 326° to 328° C.

Example 2

800 parts of 1,4,5,8-naphthalene-tetracarboxylic acid are dissolved at 30° to 40° C. in 1200 parts by volume of water and 1600 parts by volume of a sodium hydroxide solution of 22% strength. For neutralizing the alkali in excess 60 parts by volume of glacial acetic acid are subsequently added. 1000 parts of bromine are added dropwise within 8 hours at 30° to 40° C. The reaction product is filtered off with suction, the press cake is boiled with dilute hydrochloric acid, filtered off, washed until neutral and dried at 100° C. The yield of crude product is 732 parts. After recrystallization from acetic acid anhydride the 4,5-dibromo-naphthalene-1,8 dicarboxylic acid anhydride melts at 375° to 376° C.

$C_{12}H_4O_3Br_2$ (356) calculated: C, 40.4%; H, 1.1%; Br, 44.9%. Found: C, 40.2%; H, 1.5%; Br, 44.8%.

When using instead of the glacial acetic acid an equivalent quantity of phosphoric acid for neutralizing the alkali in excess, the same result is obtained.

Example 3

300 parts of 1,4,5,8-naphthalene-tetracarboxylic acid are dissolved in 4000 parts by volume of water and 600 parts by volume of a sodium hydroxide solution of 22% strength and neutralized with 100 parts by volume of glacial acetic acid. 3200 parts by volume of a sodium hypochlorite liquor are added slowly at 65° to 70° C., the pH-value being maintained at 5 to 6 by adding further acetic acid. The precipitated reaction product is filtered off and worked up as described in Example 1. The 4,5-dichloro-naphthalene-1,8-dicarboxylic acid anhydride is obtained in very good yield.

Example 4

400 parts of 1,4,5,8-naphthalene-tetracarboxylic acid are dissolved in 6000 parts of water and 500 parts by volume of a sodium hydroxide solution of 33% strength. About 20 parts of glacial acetic acid are added to the solution. 500 parts of bromosuccinimide are introduced within 4 hours at 30° to 40° C. The mixture is stirred for 20 hours at 40° C., 80 parts of sodium bisulfite are added and the whole is filtered. The press cake is washed with a salt solution of 15% strength, until the cake is free from soluble ingredients, boiled with dilute hydrochloric acid, filtered off, washed until neutral and dried at 100° C. The yield of 4,5-dibromo-naphthalene-1,8-dicarboxylic acid anhydride is 368 parts. The melting point of the crude product is between 360° and 362° C.

Instead of adding glacial acetic acid, carbon dioxide may likewise be introduced into the solution obtained, until a pH-value of about 5 is attained.

I claim:

1. A process for preparing a member selected from the group consisting of 4,5-dichloro- and 4,5-dibromo-naphthalene-1,8-dicarboxylic anhydride, which comprises dissolving 1,4,5,8-naphthalene-tetracarboxylic acid in water with the addition of an alkaline reacting agent selected from the group consisting of alkali metal hydroxides, alkali metal carbonates, alkali metal acetates and alkali metal phosphates and reacting the solution so obtained within a pH-range between 4 and 6.5 at a temperature between 10° and 70° C. with a halogenating agent selected from the group consisting of chlorine, bromine, sodium hypochlorite and N-bromsuccinimide.

2. A process as claimed in claim 1, wherein the reaction is carried out within a pH-range between 5 and 6 and at a temperature between 30° and 40° C.

No references cited.